(12) United States Patent
Madhu et al.

(10) Patent No.: US 11,007,906 B2
(45) Date of Patent: May 18, 2021

(54) VEHICLE SEAT FOLD MECHANISM

(71) Applicant: Lear Corporation, Southfield, MI (US)

(72) Inventors: Adarsha B. Madhu, Novi, MI (US); Stephen Douglas Redwood, Flat Rock, MI (US); Christopher O. Jasman, Macomb Township, MI (US)

(73) Assignee: Lear Corporation, Southfield, MI (US)

( * ) Notice: Subject to any disclaimer, the term of this patent is extended or adjusted under 35 U.S.C. 154(b) by 81 days.

(21) Appl. No.: 16/426,522

(22) Filed: May 30, 2019

(65) Prior Publication Data
US 2020/0376987 A1 Dec. 3, 2020

(51) Int. Cl.
*B60N 2/12* (2006.01)
*B60N 2/22* (2006.01)
*B60N 2/235* (2006.01)

(52) U.S. Cl.
CPC .............. *B60N 2/12* (2013.01); *B60N 2/2236* (2013.01); *B60N 2/2352* (2013.01)

(58) Field of Classification Search
CPC ...... B60N 2/12; B60N 2/2236; B60N 2/2352; B60N 2/235; B60N 2/2354; B60N 2/2356
USPC .................................................. 297/340–342
See application file for complete search history.

(56) References Cited

U.S. PATENT DOCUMENTS

| 5,531,503 | A | * | 7/1996 | Hughes | B60N 2/12 |
| | | | | | 297/341 |
| 5,683,140 | A | * | 11/1997 | Roth | B60N 2/12 |
| | | | | | 248/394 |
| 5,695,247 | A | * | 12/1997 | Premji | B60N 2/12 |
| | | | | | 297/341 |
| 5,871,259 | A | * | 2/1999 | Gehart | B60N 2/23 |
| | | | | | 297/361.1 |
| 6,336,679 | B1 | * | 1/2002 | Smuk | B60N 2/0705 |
| | | | | | 297/341 |
| 7,963,604 | B2 | | 6/2011 | Becker et al. | |
| 8,777,314 | B2 | | 7/2014 | Nock et al. | |
| 10,150,393 | B2 | | 12/2018 | Pluta et al. | |
| 10,286,814 | B2 | | 5/2019 | Ploch et al. | |
| 2004/0075323 | A1 | * | 4/2004 | Blair | B60N 2/3011 |
| | | | | | 297/331 |
| 2012/0280548 | A1 | * | 11/2012 | Nock | B60N 2/20 |
| | | | | | 297/354.1 |
| 2014/0015297 | A1 | * | 1/2014 | Cooley | B60N 2/3013 |
| | | | | | 297/378.1 |
| 2018/0215288 | A1 | | 8/2018 | Hiemstra et al. | |
| 2019/0344741 | A1 | * | 11/2019 | Korona | B60N 2/002 |

FOREIGN PATENT DOCUMENTS

| DE | 102011012562 B4 | 12/2012 |
| WO | 2005108152 A2 | 11/2005 |

* cited by examiner

*Primary Examiner* — Mark R Wendell
(74) *Attorney, Agent, or Firm* — Brooks Kushman P.C.

(57) ABSTRACT

A vehicle seat assembly has a seat base, a seat back rotatably connected to the seat base and movable between an upright position and a folded position. An arm has a first end region connected to the seat base and a second end region defining a cam surface. A follower such as a pin is connected to the seat back and fixed relative thereto. The follower engages the cam surface when the seat back is in the folded position.

20 Claims, 4 Drawing Sheets

VEHICLE SEAT FOLD MECHANISM

TECHNICAL FIELD

The disclosure relates to a mechanism for a vehicle seat assembly having a walk in or easy entry mechanism.

BACKGROUND

A vehicle seat assembly may be provided with a mechanism to fold the seat back relative to the seat base. Examples of seat folding mechanisms are disclosed in U.S. Pat. No. 8,777,314, PCT Pub. No. WO05/108152 A2, and German Pat. No. DE102011012562 B4.

SUMMARY

In an embodiment, a vehicle seat assembly is provided with a track adapted to be mounted to a vehicle, and a seat base mounted to the track to translate thereon. A seat back is rotatably connected to the seat base and being movable between an upright position and a folded position. An arm is rotatably coupled to one of the seat base and the seat back, with the arm defining a cam surface. A spring member is connected to the arm and the one of the seat base and the seat back. A follower is connected to the other of the seat base and the seat back, with the follower engageable with the cam surface of the arm when the seat back is pivoted between the folded position and the upright position. A seat release mechanism is connected to the seat back, to release the seat back from the upright position and cause the seat base to translate along the track. The seat back is disengaged from the upright position through actuation of the seat release mechanism. The seat back is reengaged to the upright position by moving the seat back relative to the seat base without actuating the seat release mechanism. The cam surface is shaped such that the seat base translates with respect to the track before the seat back rotates towards the upright position with respect to the seat base.

In a further embodiment, the spring member biases the arm in a first direction. The cam surface defines a convex transition region positioned between a backdrive region and a locking region. The spring member is further compressed, and the arm is rotated in a second direction opposite to the first direction, in response to engagement of the follower with the transition region.

In an even further embodiment, the follower sequentially engages the locking region, the transition region, and the backdrive region as the seat back is pivoted from the folded position to the upright position.

In another embodiment, a vehicle seat assembly is provided with a seat base, and a seat back pivotally connected to the seat base and movable between an upright position and a folded position. An arm has a first end region connected to the seat base and a second end region defining a cam surface. A follower is connected to the seat back and fixed relative thereto, with the follower engaging the cam surface when the seat back is in the folded position.

In a further embodiment, a biasing member is connected to the seat base and the arm to rotationally bias the arm in a first direction. The biasing member is compressed in response to the follower engaging the cam surface such that the arm is rotated in a second direction opposite to the first direction.

In an even further embodiment, a range limit is connected to the seat base, the range limit positioned to contact the arm when the seat back is in the upright position and the follower is spaced apart from arm and the cam surface such that the range limit limits movement of the arm in the first direction.

In another even further embodiment, the cam surface has a first portion and a second portion, with the second portion positioned between the first portion and the first end region.

In a yet even further embodiment, the biasing member is further compressed to move the arm in the second direction during a transition when the follower moves between the first portion and the second portion of the cam surface.

In another yet even further embodiment, the follower engages the first portion in response to the seat back moving towards the folded position to move the arm in the second direction opposite to the first direction. The follower engages the second portion when the seat back is in the folded position. The follower engages the second portion in response to the seat back moving towards the upright position to move the arm in the second direction.

In a yet even further embodiment, at a location of engagement of the follower, the first portion of the cam surface is oriented at a backdrive angle. The backdrive angle is defined as an angle between an arm line and a normal line, with the arm line extending from the location of engagement to a pivot point of the arm, and the normal line extending perpendicularly to the first portion at the location of engagement. The backdrive angle is less than ninety degrees such that engagement of the follower with the first portion causes the arm to move in the second direction without binding.

In another yet even further embodiment, at a location of engagement of the follower when the seat back is in the folded position, the second portion of the cam surface is oriented at a locking angle. The locking angle is defined as an angle between an arm line and a normal line, with the arm line extending from the location of engagement to a pivot point of the arm, and the normal line extending perpendicularly to the second portion at the location of engagement. The locking angle is within a range of ten to thirty degrees such that engagement of the follower with the second portion maintains the position of the arm to maintain the seat back in the folded position while the seat base is translated rearward.

In still yet even further embodiment, the locking angle is further defined as being within a range of fifteen to twenty degrees.

In a yet even further embodiment, from the folded position, the seat back is pivotable relative to the seat base with a force imparted on the seat back, such that the follower travels along the second portion of the cam surface and then along the first portion of the cam surface as the seat back is moved towards the upright position relative to the seat base.

In another further embodiment, a seat release mechanism is connected to the seat back. The seat release mechanism is actuatable to release the seat back to pivot relative to the seat base from the upright position toward the folded position. The seat back is pivotable from the folded position toward the upright position without requiring actuation of the seat release mechanism.

In an even further embodiment, a sliding track mechanism is connected to the seat base and the seat release mechanism. The seat release mechanism is actuatable to translate the seat base relative to the sliding track mechanism. The follower is engagable with the cam surface to maintain the seat back in the folded position while the seat base is translated rearward with respect to the sliding track mechanism, such that the seat base translates with respect to the sliding track mechanism before the seat back pivots towards the upright position.

In a further embodiment, the arm has a bracket extending from a first end to a second end, with the first end of the bracket forming the first end of the arm and rotatably connected to the seat base. The arm has a leaf spring having a first end region connected to a second end of the bracket, with a second end region defining the cam surface and an intermediate region extending between the first and second end regions. The cam surface is defined as a concave surface positioned between a convex surface and the intermediate region of the leaf spring.

In an even further embodiment, the arm has an elastomeric element connected to the leaf spring and positioned to contact the first end region and the intermediate region of the leaf spring when compressed.

In a yet even further embodiment, the first end region and the intermediate region are substantially parallel to one another. The elastomeric element is positioned to contact the second end region of the leaf spring when compressed.

In a still yet even further embodiment, the elastomeric element is spaced apart from second end region of the leaf spring.

In an embodiment, a vehicle seat assembly is provided with a seat base, and a seat back pivotally connected to the seat base and movable between an upright and a folded position. An arm extends from a first end region to a second end region, with the first end region rotatably connected to one of the seat base and the seat back. The second end region defines a cam surface having a concave section positioned between a convex section and the first end region. A pin is connected to the other of the seat base and the seat back and fixed relative thereto, with the pin engaging the cam surface when the seat back is in the folded position.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
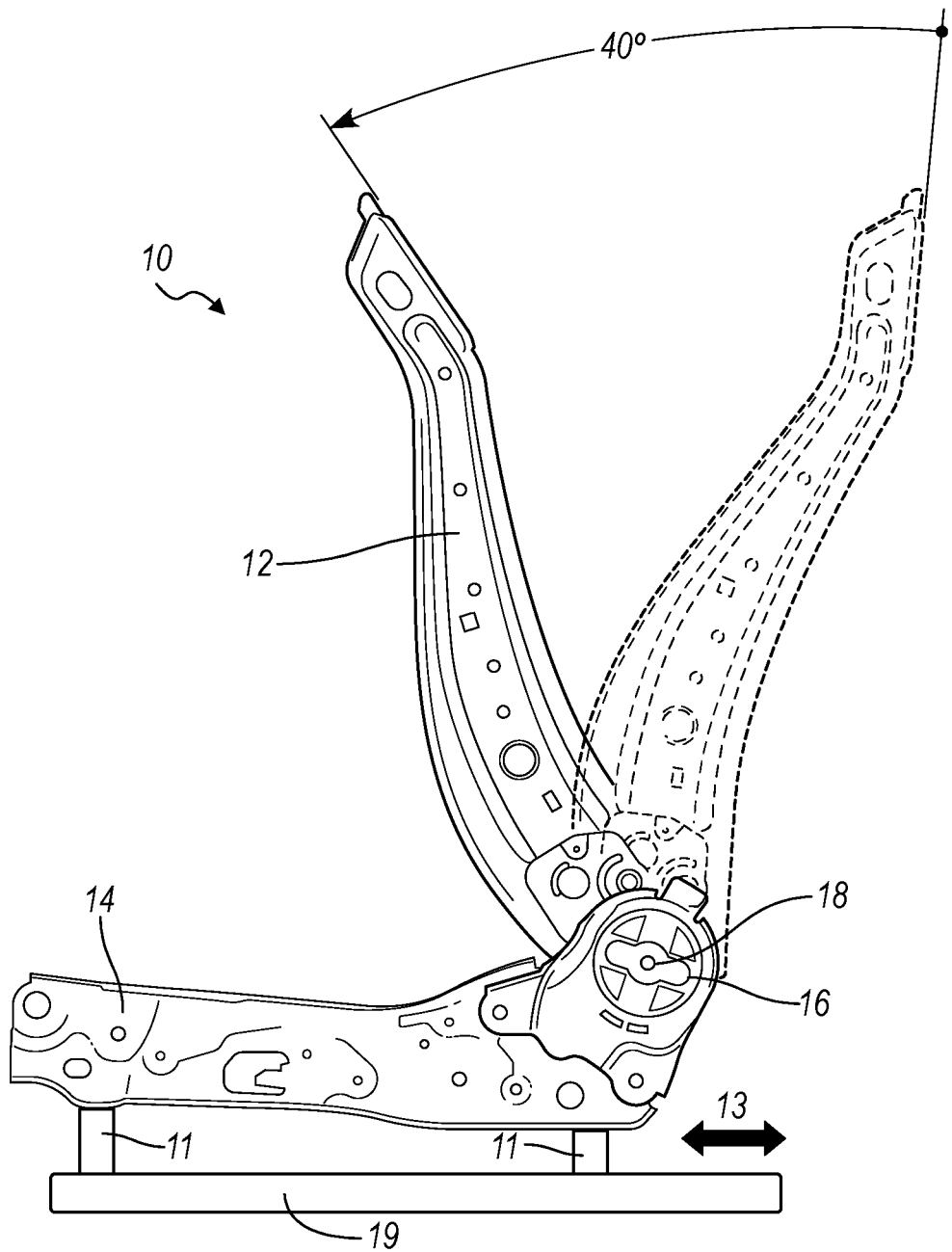
FIG. 1 is a schematic of a vehicle seat assembly.

FIG. 1 illustrates a vehicle seat assembly 10 having a seat back 12, a seat base 14, a sliding track mechanism 11, and a seat release mechanism 16. The seat back 12 is pivotally connected to the seat base 14 such that the seat back 12 can fold, pivot, or rotate forward to allow for ingress to or egress from a vehicle seat assembly or seating row positioned aft of the vehicle seat assembly 10 in a vehicle, to provide storage of items over the seat back, or the like. For example, the vehicle seat assembly 10 is in the front of the vehicle for a driver or passenger, and the seat back 12 is pivoted or folded forward about a pivotal axis 18 to allow a passenger to get into or out of a rear seating row or to access cargo in a rear seating row of the vehicle. Alternately, the folding mechanism 16 may be used with a vehicle seat assembly 10 in a second row of seats to gain access to a third row. According to further examples, the vehicle seat assembly 10 may be provided as a front row seat in a two-door or three-door vehicle, or as a second row seat in a four-door or five-door vehicle.

As illustrated in FIG. 1, the seat base 14 may also translate along the sliding track mechanism 11 in the fore/aft direction 13. For example, the seat release mechanism 16 has a lever, handle, or other mechanism, that a user engages to release the seat back 12 and allow the seat back 12 to pivot, or fold forward, with respect to the seat base 14. The seat release mechanism 16 may be connected to the sliding track mechanism 11 by a linkage, such as a Bowden cable, or the like. As the seat back 12 folds forward, the linkage is tensioned, or otherwise engaged, such that the sliding track mechanism 11 is released and the seat base 14 slides forward on the tracks 19. This combination of the seat back 12 pivoting and the seat base 14 sliding forward provides additional clearance to the area in a vehicle behind the seat 10, i.e. to a second row of seats, and places the seat 10 in a walk in configuration or easy entry configuration.

The seat back 12 is movable between an upright position as shown in FIG. 1 in broken lines, and a folded position with the seat back 12 pivoted towards the seat base 14 about the axis 18. When the seat back 12 is in a folded position, the seat base 14 translated in a forward direction along axis 13. The degrees of pivotal motion and amount of translational motion of the seat 10 may vary based on the design criteria for the vehicle seat assembly 10 and the clearance permitted by the structure of the seat back 12 and the seat base 14 and the vehicle. For example, the seat back 12 may fold approximately forty-five degrees as shown, although a range of motion through more than or less than forty-five degrees is also contemplated for the seat back. The seat back 12 may additionally be positioned at other seat back angles selected by the user, for example, at a greater degree of recline.

In the prior art, to return the seat back 12 to the upright position, the user would need to activate one or more mechanisms. For example, in various prior art, the user unfolds the seat back 12 and places it in the upright position by activating a lever or other input to the seat release mechanism. The seat base 14 remained locked in the forward position, and the sliding track mechanism also needed to be activated by the user to slide the seat base 14 rearward along the tracks 11 to the starting or use position.

Figure 2:
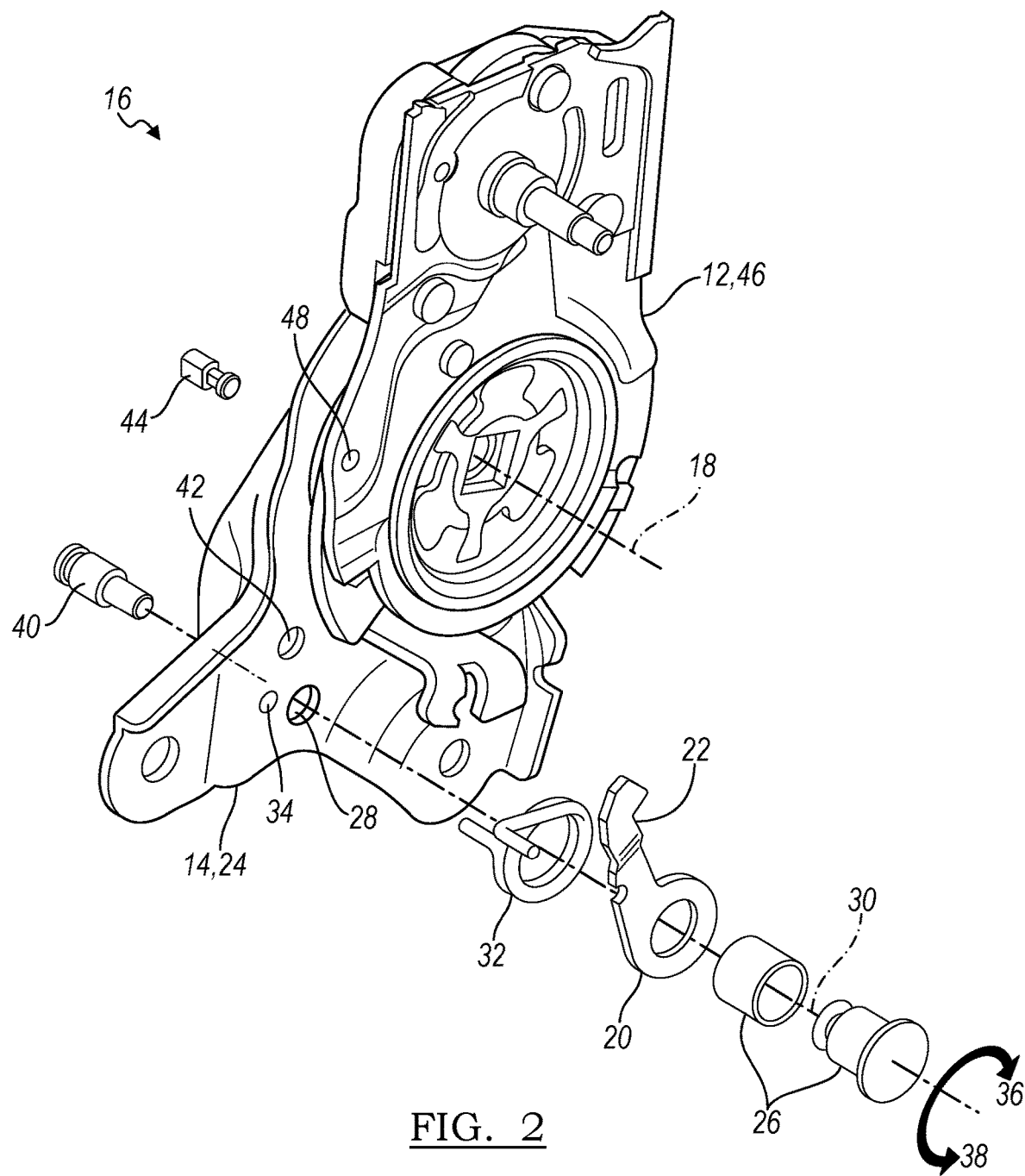
FIG. 2 is a partially exploded view of a mechanism for a seat assembly according to an embodiment.

FIG. 2 illustrates an embodiment of a seat release mechanism 16 for use with a vehicle seat assembly 10 in a partially exploded view. The seat release mechanism 16 is located at the junction of the seat back 12 and the seat base 14. The seat release mechanism 16 may contain features to provide for various recline angles of the seat back 12 with respect to the seat base 14 as are known in the art.

The seat release mechanism 16 has an arm 20 defining a cam surface 22. The arm 20 is pivotally connected to a bracket 24 that is connected to or formed as a part of the seat base 14. The arm 20 may be pivotally connected to the bracket 24 via aperture 28 defined by the bracket using a pivotal connection 26 such as a bushing and pin or rivet. The arm 20 pivots or rotates about a pivot point defined by axis 30.

A spring element, or biasing element 32 has one end connected to the arm 20, and the other end connected to the bracket 24, for example, via aperture 34. The spring member 32 may be a torsion spring according to an embodiment; although other spring members are also contemplated. The spring member 32 biases the arm 20 in a first direction 36. If the arm is moved in a second direction 38, the spring member 32 is compressed.

A first pin 40 or a stop pin 40 is connected to and fixed relative to the bracket 24. The stop pin 40 may be connected to the bracket 24 via an aperture 42 formed in the bracket 24. The pin 40 is positioned to limit travel or movement of the arm 20 in the first direction 36. The stop pin 40 may be provided as a separate pin or other range limit element, or may be integrally formed, e.g. as a stamping or other protrusion on the bracket 24.

A second pin 44 or a locking pin 44 is connected to and fixed relative to a bracket 46 that is connected to or formed as a part of the seat back 12. The locking pin 44 may be provided as a follower. The locking pin 44 may be connected to the bracket 46 via an aperture 48 formed in the bracket 46. The pin 44 therefore moves with the seat back 12 relative to the seat base 14 and the arm 20. The locking pin 44 or follower may be provided as a separate pin or other follower element, or may be integrally formed, e.g. as a stamping or other protrusion on the bracket 24.

The pin 44 is engageable with the cam surface 22 of the arm 20 when the seat back 12 is moved between the folded position and the upright position relative to the seat base 14. The cam surface 22 follows the pin 44 as the seat back 12 pivots with respect to the seat base 14. The spring member 32 is compressed in response to the pin 44 engaging the cam surface 22 such that the arm 20 is rotated in a second direction 38 opposite to the first direction.

The stop pin 40 is positioned to contact the arm 20 when the seat back 12 is in the upright position and the locking pin 44 is spaced apart from arm 20 and the cam surface 22 such that the stop pin 40 limits movement of the arm 20 in the first direction 36.

In an alternative embodiment of FIG. 2, the arm 20, the spring member 32, and the pin 40 may be provided on the seat back 12, while the pin 44 is provided on the seat base 14.

Figure 3:
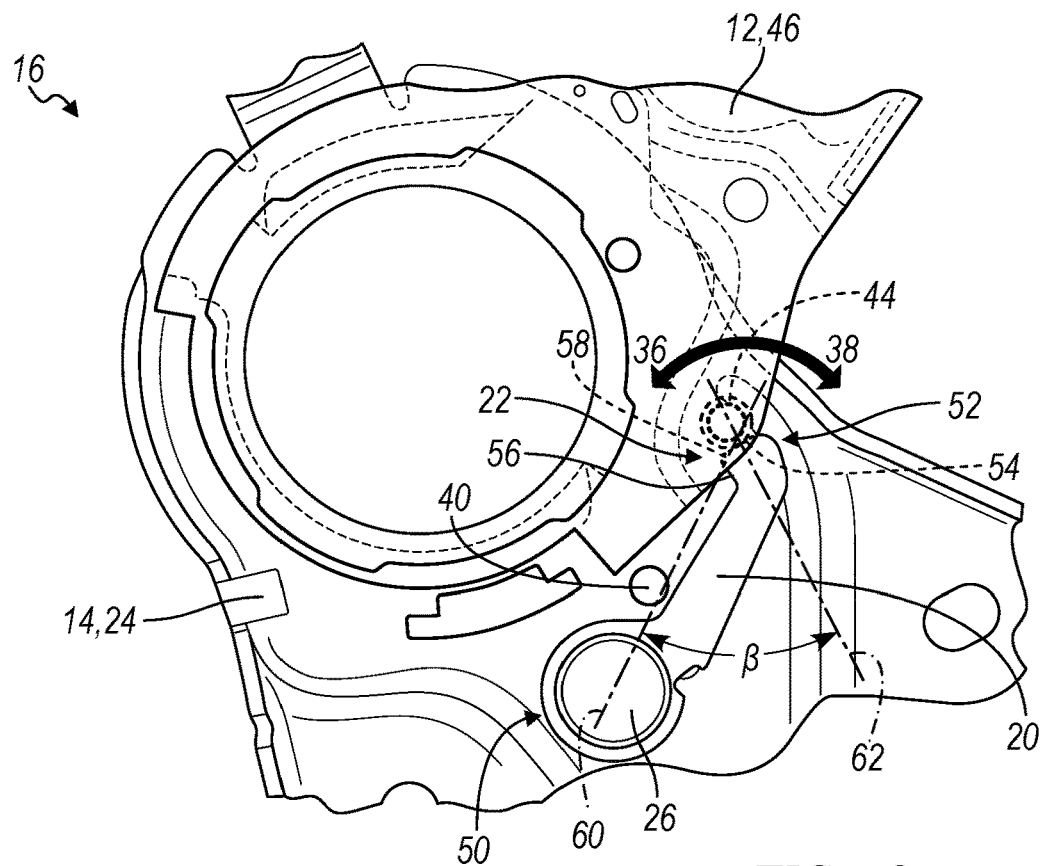
FIG. 3 is a partial schematic view of a seat assembly and the mechanism of FIG. 2 in a first position.
Figure 4:
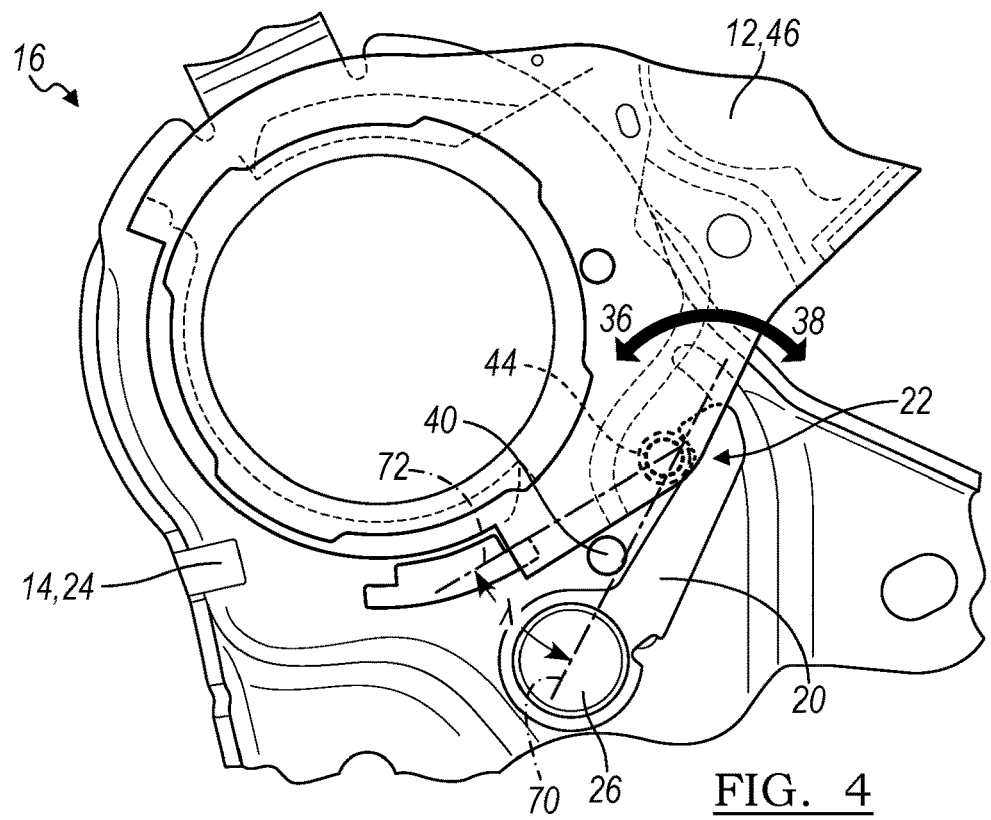
FIG. 4 a partial schematic view of a seat assembly and the mechanism of FIG. 2 in a second position.

Referring to FIGS. 2-4, the features of the seat release mechanism 16 are described in greater detail. The arm 20 has a first end region 50 and a second end region 52. The first end region 50 is rotatably connected to the seat base 14 via pivotal connection 26. The second end region 52 defines the cam surface 22. The cam surface 22 has a first portion 54 and a second portion 56, with the second portion 56 positioned between the first portion 54 and the first end region 50. The first portion 54 is therefore farther from the first end region 50 than the second portion 56, and closer to the second end 52 of the arm. The first portion 56 may be referred to as a backdrive portion 54. The second portion 56 may be referred to as a locking portion 56. The second portion 56 may form a concave section or region with the adjacent structure of the arm 20.

A transition region 58 is positioned between and directly adjacent to the first and second portions 54, 56. The transition region 58 may be provided by a convex shape. The first and/or the second sections 54, 56 may be linear, concave arcuate, convex arcuate, or another profile shape as is known in the art. The pin 44 sequentially engages the locking region 56, the transition region 58, and the backdrive region 54 as the seat back 12 is pivoted from the folded position to the upright position. The pin 44 sequentially engages the backdrive region 54, the transition region 58, and the locking region 56 as the seat back 12 is pivoted from the folded position to the upright position.

As the profile of the cam surface 22 changes, the amount of force, or the amount of compression of the spring 32, changes as the pin 44 moves relative to the cam surface 22. For example, the pin 44 moving over the transition region 58 between the first portion 54 and the second portion 56 involves a large amount of compression of the spring 32 over a short distance of the cam surface 22, since it is a steep profile and a convex shape.

The pin 44 engages the first portion 54 in response to the seat back 12 moving towards the folded position to move the arm 20 in the second direction 38 opposite to the first direction. The pin 44 engages the second portion 56 when the seat back 12 is in the folded position. The pin 44 engages the second portion 56 in response to the seat back 12 moving from the folded position and towards the upright position to move the arm in the second direction 38 until the pin 44 reaches the transition region 58.

The first portion 54 and the second portion 56 of the cam surface 22 are each provided with a specified angle to provide the required backdrive motion and unlocking motion of the arm. The first and second portions 54, 56 are shaped to prevent binding of the seat back as it moves, and are furthermore shaped to provide a desired force to move the arm and seat back.

The first portion 54 of the cam surface, or backdrive portion, is oriented at a specified angle or backdrive angle $\beta$. When the pin 44 first engages or contacts the backdrive region 54, the first portion 54 of the cam surface at the location of engagement with the pin 44 is oriented at the backdrive angle $\beta$. The backdrive angle $\beta$ is defined as an angle between an arm line 60 and a normal line 62. The arm line 60 extends from the location of engagement with the pin 44 to a pivot point of the arm 20. The normal line 62 extends perpendicularly to the first portion 54 at the location of engagement of the pin 44. The backdrive angle $\beta$ is shown in FIG. 3, and is the smaller of the angles formed between the normal line 62 and the arm line 60. According to one example, the backdrive angle $\beta$ is less than ninety degrees. In another example, the backdrive angle is within a range of 20-85 degrees. In a further example, the backdrive angle $\beta$ is within a range of 20-50 degrees. The first section 54 may extend colinearly or substantially colinearly with the location of engagement of the pin 44 and at the backdrive angle $\beta$ as shown. For purposes of the disclosure, "substantially" may lie within a range of plus or minus two degrees, plus or minus five degrees, or plus or minus ten degrees of the specified angle.

The second portion 56 of the cam surface, or locking portion 56, is oriented at a specified angle or locking angle $\lambda$. When the pin 44 engages or contacts the locking region 56 with the seat back 12 in the folded position, the second portion 56 of the cam surface at the location of engagement with the pin 44 is oriented at the locking angle $\lambda$. The locking angle $\lambda$ is defined as an angle between an arm line 70 and a normal line 72. The arm line 70 extends from the location of engagement of the pin 44 to a pivot point of the arm 20. The normal line 72 extending perpendicularly to the second portion 56 at the location of engagement of the pin 44. The locking angle $\lambda$ is shown in FIG. 4, and is the smaller of the angles formed between the normal line 72 and the arm line 70. According to one example, the locking angle λ is within a range of seven to thirty degrees. In a further example, the locking angle is within a range of fifteen to twenty degrees. The second section 56 may extend colinearly or substantially colinearly with the location of engagement of the pin and at the locking angle λ as shown.

The mechanism 16 and vehicle seat assembly 10 as shown in FIGS. 1-4 provides for a release of the seat back 12 into a folded position, for example, for easy entry, and also provides for a simplified return to the upright, use position of the seat back 12 by the user.

According to an example, a seat release mechanism 16 for the vehicle seat assembly is actuated to release the seat back 12 from the upright position and cause the seat base 14 to translate along the track. The actuation of the seat release mechanism 16 disengages the seat back 12 from the upright position such that the seat back 12 begins to move towards the folded position. A spring member in the seat release mechanism, as well as the mass of the seat back, may cause the seat back to automatically move to the folded position in response to the seat release mechanism being actuated, e.g., the pin 44 will move the arm 20 and engage the locking section 56. Actuation of the seat release mechanism may additionally cause the vehicle seat 10 to slide forward along the track to provide a larger space behind the seat.

To return the vehicle seat 10 to a use position with the seat back 12 in the upright position, the seat back 12 is reengaged to the upright position by moving the seat back 12 relative to the seat base 14 without actuating the seat release mechanism. The cam surface 22 is shaped to engage with the locking pin 44 such that the seat base 14 translates with respect to the track before the seat back 12 pivots towards the upright position with respect to the seat base.

As the seat back 12 is rotated towards the folded position from the upright position, the pin 44 comes into contact or engagement with the first, backdrive portion 54 of the cam surface 22, as is shown in FIG. 3. As the seat back 12 is rotated further towards the folded position, the locking pin 44 causes the arm 20 to move in the second direction 38 and away from the stop pin 40. This motion may be referred to as a back-driving motion of the arm 20. The arm 20 continues to rotate in the second direction 38 as the locking pin 44 moves along the first portion 54 of the cam surface.

The locking pin 44 then passes the transition region 58 on the cam surface 22, and begins to move along the second, locking portion 56. As the pin 44 moves along the locking portion 56 while the seat back 12 continues to move towards a folded position, the arm 20 moves in the first direction 36 based on the cam surface 22 shape. When the seat back 12 is in the folded position, the locking pin 44 is engaged with the locking portion 56 of the cam surface 22 as shown in FIG. 4.

To move the seat back from the folded position to the upright position, the user pulls or moves the seat back 12 towards the upright position, and without operating a lever or other user input associated with the seat release mechanism. In one example, the user may exert a force on the seat back 12 near an upper shoulder support region to return the seat 10 from the easy entry position. The locking pin 44 engages and imparts a force on the locking portion 56 of the cam surface, and moves the arm 20 in the second direction 38. The locking pin 44 moves along the locking portion 56 until it reaches the transition region 58 and further compresses the spring 32. Once the locking pin 44 passes the transition region 58, the shape of the backdrive section 54 of the cam surface 22 allows the arm 20 to begin rotating in the first direction 36. The locking pin 44 travels along the backdrive section 54 of the cam until the seat back 12 is unfolded sufficiently such that the locking pin 44 begins to move away from the arm 20. The arm 20 engages the stop pin 40 to limit or prevent further movement or rotation of the arm in the first direction 36 and orient the backdrive section 54 of the cam surface for engagement with the locking pin 44 in a future folding motion.

When the seat back 12 is in the folded position, or not in the upright position, the seat back 12 is freely pivotable by a user without interacting with a lever or input to the seat release mechanism 16. For example, when the seat back 12 is in the folded position, and the pin 44 is somewhere along the cam surface 22, the user can move the seat back 12 relative to the seat base 14 and or the seat base 14 relative to the tracks 19 by only imparting a force on the seat back 12.

When returning the seat back 12 to the upright position, the pin 44 engages with the cam surface 22 to maintain the seat back 12 in the folded position while the seat base 14 is translated rearward with respect to the sliding track mechanism, such that the seat base 14 translates with respect to the sliding track mechanism before the seat back 12 pivots towards the upright position. When the seat 10 no longer travels rearward along the tracks and the seat base 14 is locked in position, the pin 44 moves the arm 20 and the seat back 12 moves to the upright position. The force provided by the spring 32 and the shape of the cam surface 22 delays the seat back 12 from unfolding, and allows the seat base 14 to travel rearward along the tracks 19 such that the seat base 14 reaches a locked position in the tracks 19 before the seat back 12 begins to pivot to an upright position. When the seat back 12 reaches the upright position, it is then locked by the seat recline mechanism 16 in the upright position. The movement of the seat back 12, from the folded position to the upright position, may be therefore done without the user touching any portion of the seat assembly 10 except the seat back 12. The user does not have to actuate or interact with a lever for the seat release mechanism 16 to reposition the seat 10 from a folded or non-upright position to the upright position, or interact with a handle, or other mechanism, for the seat track mechanism 11, thereby simplifying the operation for the user. For example, the seat back 12 is movable relative to the seat base 14, and the seat base 14 is movable relative to the tracks 19, when a force is imparted on the seat back 12 by a user, unless the seat is in the locked upright position.

Figure 5:
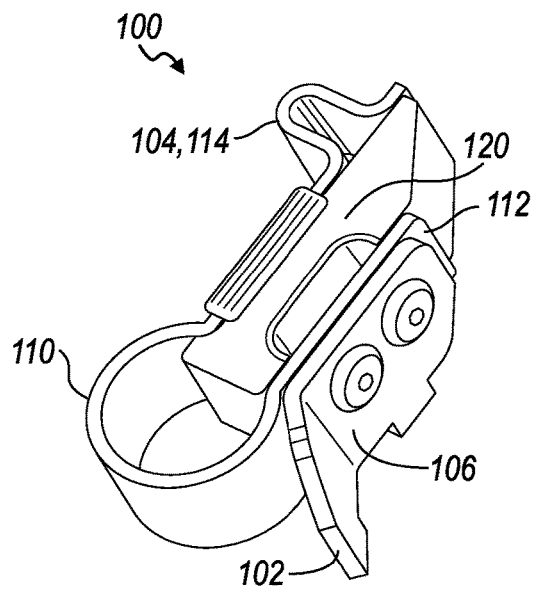
FIG. 5 is a perspective view of an arm for use with the vehicle seat assembly of FIG. 1 according to another embodiment.
Figure 6:
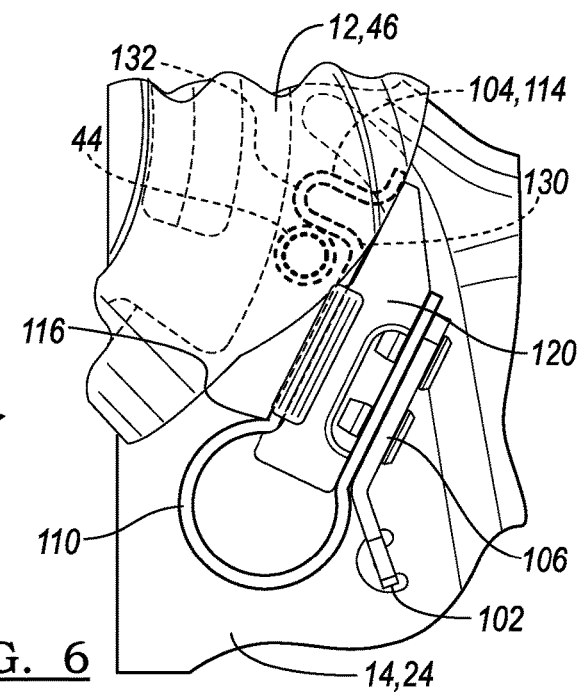
FIG. 6 is a partial schematic view of a seat assembly and the arm of FIG. 5 in a first position.
Figure 7:
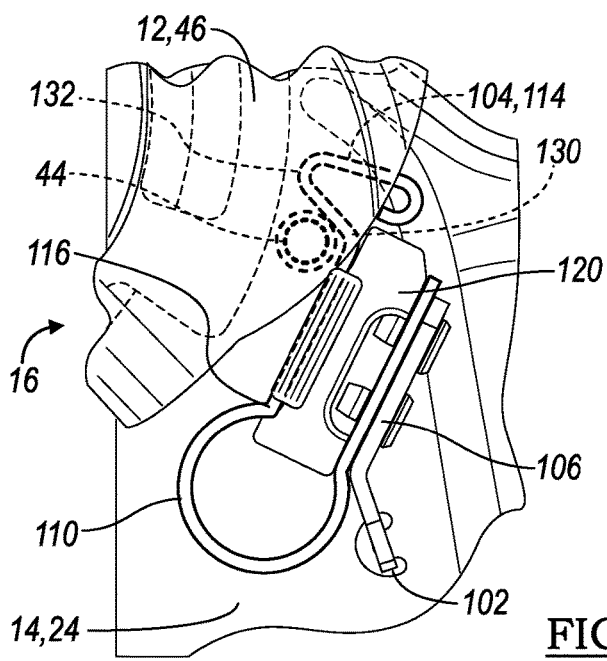
FIG. 7 is a partial schematic view of a seat assembly and an arm according to yet another embodiment in a first position.

Referring to FIGS. 5-7, another embodiment of a mechanism for use in the seat release mechanism 16 is illustrated, and provides operation of the vehicle seat 10, e.g., a soft locking feature when the seat is in the easy entry, folded position as described above. An arm assembly 100 replaces the arm 20 and the spring 32 shown in FIGS. 2-4. Elements in FIGS. 5-7 that are the same as or similar to those shown in FIGS. 1-4 have the same reference numbers as those used above for simplicity.

Referring to FIGS. 5-6, the arm 100 has a first end region 102 rotatably connected to the seat base and a second end region defining a cam surface 104. The arm 100 is configured to provide a compressive force when the cam surface is biased away from the pin The arm 100 has a bracket 106 extending from a first end to a second opposite end, with the first end of the bracket forming the first end 102 of the arm and being connected to the seat base 14 or seat base bracket 14. The bracket 106 itself may act as a spring member as it is provided with a structure similar to that of a cantilever beam, with the second end of the bracket not connected to the seat base.

The arm 100 has a spring member 110 with a first end region 112 connected to a second end of the bracket, and a second end region 114 defining the cam surface 104. An intermediate region 116 extends between the first and second end regions 112, 114. In one example, spring member 110 is a leaf spring. The spring 110 may be a leaf spring, or other spring as is known in the art. The spring member 110 may be curved such that the first and second end regions 112, 114 are adjacent to one another, and the spring resembles a U-shape with the first end region 112 and the intermediate region 116 being substantially parallel to one another.

An elastomeric element 120 or damper may be positioned within the spring member 110 such that it is in contact with the spring member 110. The elastomeric element 120 may be positioned to contact the first end region 112 and the intermediate region 116 of the leaf spring when compressed. The damper 120 is placed within the interior of the spring member 110 to damp the motion of the spring member and/or provide additional resistance to compression. For example, the damper 120 is positioned on an internal side of the spring member 110. The damper 120 may be connected to the spring member 110 using molded in clips, an adhesive, a mechanical fastener, or otherwise as is known in the art. For example, the damper 120 is an elastomeric block, such as rubber, which may be shaped to correspond with the shape of the spring member 110.

In one example, the elastomeric element 120 extends towards and is positioned to additionally contact the second end region 114 of the leaf spring 110 when compressed as shown in FIGS. 5-6. In another example, and as shown in FIG. 7, the elastomeric element 120 is spaced apart from second end region 114 of the leaf spring such that it is only positioned to contact the first end region 112 and the intermediate region 116.

The second end region 114 of the spring member 110 defines the cam surface 104 or locking section. The cam surface 104 may be defined as a concave surface 130 positioned between a convex surface 132 and the intermediate region 116 of the leaf spring. The locking pin 44 is connected to the seat back 12 and fixed relative thereto, and the pin 44 engages the cam surface 104 when the seat back 12 is in the folded position as shown in FIGS. 6-7. In one example, and as shown, the locking pin 44 engages the cam surface when the seat back is in the folded position. The locking pin 44 may engage the cam surface 104 and retain the seat back 12 in the folded position based on a combination of the compressive force cause by the leaf spring 110 structure and shape of the cam surface 104, as well as frictional engagement with the cam surface. The resistance of the pin 44 exiting the cam surface with the seat back 12 unfolding is higher than the sliding resistance of the seat base 14 along the tracks 19, thereby causing the seat base 14 to translate before the seat back 12 rotates. Once the seat base 14 is locked into position on the tracks 19 by the mechanism 11, the force exerted by the user on the seat back 12 will cause the pin 44 to exit the cam surface 104 as the seat back return to the upright position. When the pin 44 is engaged with the cam surface 104, the seat back 12 may be moved without any actuation of an associated seat release mechanism 16 or sliding track mechanism 11. The user may simply move the seat back 12 and/or the seat base 14 by imparting a force directly on the seat back 12.

As shown in FIGS. 6-7, the shape of the cam surface 104, the concave section 130 and the convex section 132 may vary.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle seat assembly comprising:
    a seat base;
    a seat back pivotally connected to the seat base and movable between an upright position and a folded position;
    an arm having a first end region connected to the seat base and a second end region defining a cam surface;
    a biasing member connected to the seat base and the arm to rotationally bias the arm in a first direction;
    a follower connected to the seat back and fixed relative thereto, the follower engaging the cam surface when the seat back is in the folded position; and
    a range limit connected to the seat base, the range limit positioned to contact the arm when the seat back is in the upright position and the follower is spaced apart from the arm and the cam surface such that the range limit limits movement of the arm in the first direction;
    wherein the biasing member is compressed in response to the follower engaging the cam surface such that the arm is rotated in a second direction opposite to the first direction.

2. The vehicle seat assembly of claim 1 wherein the cam surface has a first portion and a second portion, the second portion positioned between the first portion and the first end region.

3. The vehicle seat assembly of claim 2 wherein the biasing member is further compressed to move the arm in the second direction during a transition when the follower moves between the first portion and the second portion of the cam surface.

4. The vehicle seat assembly of claim 2 wherein the follower engages the first portion in response to the seat back moving towards the folded position to move the arm in the second direction opposite to the first direction;
    wherein the follower engages the second portion when the seat back is in the folded position; and
    wherein the follower engages the second portion in response to the seat back moving towards the upright position to move the arm in the second direction.

5. The vehicle seat assembly of claim 2 wherein, at a location of engagement of the follower, the first portion of the cam surface is oriented at a backdrive angle, the backdrive angle defined as an angle between an arm line and a normal line, the arm line extending from the location of engagement to a pivot point of the arm, the normal line extending perpendicularly to the first portion at the location of engagement, the backdrive angle being less than ninety degrees such that engagement of the follower with the first portion causes the arm to move in the second direction without binding.

6. The vehicle seat assembly of claim 2 wherein, at a location of engagement of the follower when the seat back is in the folded position, the second portion of the cam surface is oriented at a locking angle, the locking angle defined as an angle between an arm line and a normal line, the arm line extending from the location of engagement to a pivot point of the arm, the normal line extending perpendicularly to the second portion at the location of engagement, the locking angle being within a range of ten to thirty degrees such that engagement of the follower with the second portion maintains the position of the arm to maintain the seat back in the folded position while the seat base is translated rearward.

7. The vehicle seat assembly of claim 6 wherein the locking angle is further defined as being within a range of fifteen to twenty degrees.

8. The vehicle seat assembly of claim 2 wherein from the folded position, the seat back is pivotable relative to the seat base with a force imparted on the seat back, such that the follower travels along the second portion of the cam surface and then along the first portion of the cam surface as the seat back is moved towards the upright position relative to the seat base.

9. The vehicle seat assembly of claim 1 further comprising a seat release mechanism connected to the seat back, wherein the seat release mechanism is actuatable to release the seat back to pivot relative to the seat base from the upright position toward the folded position, and wherein the seat back is pivotable from the folded position toward the upright position without requiring actuation of the seat release mechanism.

10. The vehicle seat assembly of claim 9 further comprising a sliding track mechanism connected to the seat base and the seat release mechanism, wherein the seat release mechanism is actuatable to translate the seat base relative to the sliding track mechanism;
   wherein the follower is engagable with the cam surface to maintain the seat back in the folded position while the seat base is translated rearward with respect to the sliding track mechanism, such that the seat base translates with respect to the sliding track mechanism before the seat back pivots towards the upright position.

11. A vehicle seat assembly comprising:
   a seat base;
   a seat back pivotally connected to the seat base and movable between an upright position and a folded position;
   an arm having a first end region connected to the seat base and a second end region defining a cam surface, wherein the cam surface has a first portion and a second portion, the second portion positioned between the first portion and the first end region;
   a follower connected to the seat back and fixed relative thereto, the follower engaging the cam surface when the seat back is in the folded position; and
   a biasing member connected to the seat base and the arm to rotationally bias the arm in a first direction;
   wherein the biasing member is compressed in response to the follower engaging the cam surface such that the arm is rotated in a second direction opposite to the first direction; and
   wherein from the folded position, the seat back is pivotable relative to the seat base with a force imparted on the seat back, such that the follower travels along the second portion of the cam surface and then along the first portion of the cam surface as the seat back is moved towards the upright position relative to the seat base.

12. The vehicle seat assembly of claim 11 wherein the biasing member is further compressed to move the arm in the second direction during a transition when the follower moves between the first portion and the second portion of the cam surface.

13. The vehicle seat assembly of claim 11 wherein the follower engages the first portion in response to the seat back moving towards the folded position to move the arm in the second direction opposite to the first direction;
   wherein the follower engages the second portion when the seat back is in the folded position; and
   wherein the follower engages the second portion in response to the seat back moving towards the upright position to move the arm in the second direction.

14. The vehicle seat assembly of claim 11 wherein, at a location of engagement of the follower, the first portion of the cam surface is oriented at a backdrive angle, the backdrive angle defined as an angle between an arm line and a normal line, the arm line extending from the location of engagement to a pivot point of the arm, the normal line extending perpendicularly to the first portion at the location of engagement, the backdrive angle being less than ninety degrees such that engagement of the follower with the first portion causes the arm to move in the second direction without binding.

15. The vehicle seat assembly of claim 11 wherein, at a location of engagement of the follower when the seat back is in the folded position, the second portion of the cam surface is oriented at a locking angle, the locking angle defined as an angle between an arm line and a normal line, the arm line extending from the location of engagement to a pivot point of the arm, the normal line extending perpendicularly to the second portion at the location of engagement, the locking angle being within a range of ten to thirty degrees such that engagement of the follower with the second portion maintains the position of the arm to maintain the seat back in the folded position while the seat base is translated rearward.

16. The vehicle seat assembly of claim 15 wherein the locking angle is further defined as being within a range of fifteen to twenty degrees.

17. A vehicle seat assembly comprising:
   a seat base;
   a seat back pivotally connected to the seat base and movable between an upright position and a folded position;
   an arm having a first end region connected to the seat base and a second end region defining a cam surface; and
   a follower connected to the seat back and fixed relative thereto, the follower engaging the cam surface when the seat back is in the folded position;
   wherein the arm further comprises a bracket extending from a first end to a second end, the first end of the bracket forming the first end region of the arm and rotatably connected to the seat base; and
   wherein the arm further comprises a leaf spring having a first end region connected to the second end of the bracket, a second end region defining the cam surface and an intermediate region extending between the first and second end regions of the leaf spring, wherein the cam surface is defined as a concave surface positioned between a convex surface and the intermediate region of the leaf spring.

18. The vehicle seat assembly of claim 17 wherein the arm further comprises an elastomeric element connected to the leaf spring and positioned to contact the first end region and the intermediate region of the leaf spring when compressed.

19. The vehicle seat assembly of claim 18 wherein the first end region and the intermediate region of the leaf spring are substantially parallel to one another; and
   wherein the elastomeric element is positioned to contact the second end region of the leaf spring when compressed.

20. The vehicle seat assembly of claim 19 wherein the elastomeric element is spaced apart from the second end region of the leaf spring.

* * * * *